(12) United States Patent
Salsich et al.

(10) Patent No.: US 8,153,924 B2
(45) Date of Patent: Apr. 10, 2012

(54) PLASMA CUTTER HAVING THERMAL MODEL FOR COMPONENT PROTECTION

(75) Inventors: Anthony Van Bergen Salsich, Appleton, WI (US); Edward Gerard Beistle, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1146 days.

(21) Appl. No.: 11/960,514

(22) Filed: Dec. 19, 2007

(65) Prior Publication Data

US 2009/0159572 A1 Jun. 25, 2009

(51) Int. Cl.
*B23K 10/00* (2006.01)

(52) U.S. Cl. .......... 219/121.36; 219/121.54; 219/121.39

(58) Field of Classification Search ............. 219/121.39, 219/121.43, 121.48, 75, 121.5, 121.52; 313/231.41; 315/111.51, 111.21
See application file for complete search history.

(56) References Cited

U.S. PATENT DOCUMENTS

| | | | |
|---|---|---|---|
| 4,117,527 A | 9/1978 | Demarest | |
| 4,251,764 A | 2/1981 | Mathews | |
| 4,410,788 A | 10/1983 | Summers et al. | |
| 4,453,073 A | 6/1984 | Bredenkamp | |
| 4,785,149 A | 11/1988 | Gilliland | |
| 4,918,285 A | 4/1990 | Thommes | |
| 4,943,699 A | 7/1990 | Thommes | |
| 5,043,554 A | 8/1991 | Kohsaka et al. | |
| 5,086,205 A | 2/1992 | Thommes | |
| 5,290,995 A | 3/1994 | Higgins et al. | |
| 5,486,675 A * | 1/1996 | Taylor et al. ............. | 219/121.59 |
| 5,726,416 A | 3/1998 | Katooka et al. | |
| 5,990,446 A | 11/1999 | Zhang et al. | |
| 5,994,675 A | 11/1999 | Bethune et al. | |
| 6,057,524 A | 5/2000 | Katooka et al. | |
| 6,087,922 A | 7/2000 | Smith | |
| 6,130,398 A | 10/2000 | Schneider et al. | |
| 6,194,682 B1 | 2/2001 | Schneider et al. | |
| 6,313,431 B1 | 11/2001 | Schneider et al. | |
| 6,326,583 B1 * | 12/2001 | Hardwick et al. ....... | 219/121.55 |
| 6,339,320 B1 | 1/2002 | Spremo et al. | |
| 6,365,868 B1 | 4/2002 | Borowy et al. | |

(Continued)

FOREIGN PATENT DOCUMENTS

| | | |
|---|---|---|
| GB | 2039174 | 7/1980 |
| JP | 02217175 | 8/1990 |
| JP | 10109166 | 4/1998 |
| WO | 9422198 A1 | 9/1994 |
| WO | WO2006035329 | 4/2006 |

OTHER PUBLICATIONS

U.S. Appl. No. 11/947,762, filed Nov. 29, 2007, Lezner et al.

(Continued)

*Primary Examiner* — Mark Paschall
(74) *Attorney, Agent, or Firm* — Fletcher Yoder PC

(57) ABSTRACT

A system is provided that includes a torch power unit. The torch power unit includes a monitor and/or control configured to determine a temperature of a component of the torch power unit based on the one or more inputs without a direct temperature measurement of the component. A method of operation is provided that includes receiving one or more inputs associated with a device, and estimating a temperature of the device based on the one or inputs without directly measuring temperature of the device. A tangible machine-readable medium is provided that includes code for determining a thermal capacity of the device, code for determining a thermal resistance of the device, and code for determining a temperature of the device based on thermal capacity and the thermal resistance method.

23 Claims, 5 Drawing Sheets

U.S. PATENT DOCUMENTS

| | | |
|---|---|---|
| 6,570,129 B1 | 5/2003 | Samodell |
| 6,892,954 B2 * | 5/2005 | Srinivasan .................... 239/74 |
| 7,091,443 B2 * | 8/2006 | Watanabe et al. ........ 219/121.52 |
| 7,547,861 B2 | 6/2009 | Jorgensen |
| 7,921,802 B2 * | 4/2011 | De Boer ....................... 118/696 |
| 2001/0042736 A1 | 11/2001 | Schneider et al. |
| 2004/0031776 A1 * | 2/2004 | Gevelber et al. ......... 219/121.36 |
| 2005/0155959 A1 | 7/2005 | Bender et al. |
| 2006/0076330 A1 | 4/2006 | Beistle et al. |
| 2006/0289492 A1 | 12/2006 | Maramatsu et al. |
| 2006/0289495 A1 | 12/2006 | Thomas et al. |
| 2008/0023449 A1 | 1/2008 | Salsich et al. |
| 2008/0023451 A1 | 1/2008 | Salsich et al. |

OTHER PUBLICATIONS

U.S. Appl. No. 11/960,425, filed Dec. 19, 2007, Salsich.

U.S. Appl. No. 11/960,466, filed Dec. 19, 2007, Salsich et al.

U.S. Appl. No. 11/960,494, filed Dec. 19, 2007, Salsich.

Millerwelds; Owner's Manual entitled "Spectrum 125C and ICE-12C Torch;" www.milierwelds.com/om/o2248e_mil.pdf; 32 pages.

Millerwelds; Article entitled "Spectrum 125C—The Power of Blue;" issued Mar. 2007; Index No. PC/13.0; www.millerselds.com/pdf/spec_sheets/PC13-0.pdf; 4 pages.

* cited by examiner

PLASMA CUTTER HAVING THERMAL MODEL FOR COMPONENT PROTECTION

BACKGROUND

The invention relates generally to metal cutting, welding, and induction heating systems, and more particularly to thermal protection of components in a torch power unit.

A plasma cutting system creates plasma (e.g., high temperature ionized gas) to cut metal or other electrically conductive material. In general, an electrical arc converts a gas (e.g., compressed air) into plasma, which is sufficiently hot to melt the work piece while the pressure of the gas blows away the molten metal. The power output and flow of the gas can affect the performance of the system.

For example, portable plasma cutting systems may include various internal components, such as transistors or other electrical devices that may be susceptible to overheating. The overheating of these components may be further aggravated by the size and compactness of portable plasma cutting systems. Because portable systems are designed with portability as a primary function, components may be closer together, reducing the space available for air flow and heat dissipation. To prevent damage to these components, it may be desirable to turn off power to these components or turn off power to the entire system, if the components reach a critical temperature.

One way to monitor the temperature of these components is through the use of thermistors or other temperature sensors. However, addition of thermistors or other temperature sensors may complicate the manufacturing or assembly of the plasma cutting system. For example, such sensors must be inserted into the motor housings, transformer windings, or other heat-sensitive components. Additionally, some components, such as motor brushes, are not obtainable with embedded thermal sensors.

BRIEF DESCRIPTION

In one embodiment, a system is provided that includes a torch power unit. The torch power unit includes a monitor and/or control configured to determine a temperature of a component of the torch power unit based on one or more inputs without a direct temperature measurement of the component.

A method of operation is provided that includes receiving one or more inputs associated with a device and estimating a temperature of the device based on the one or more inputs without directly measuring temperature of the device.

A tangible machine-readable medium is provided that includes code for determining a thermal capacity of the device, code for determining a thermal resistance of the device, and code determining a temperature of the device based on thermal capacity and the thermal resistance.

In another embodiment, a system is provided that includes a controller configured to estimate the temperature of a device based on a thermal model and one or more feedback parameters without direct temperature measurement of the device.

In another embodiment, a system is provided that includes a torch power unit. The torch power unit includes one or more components comprising a generator, a power converter, a compressor, a motor, or a combination thereof, and a monitor and/or control configured to determine the temperature of the one or more components based on one or more properties of the components, wherein the properties comprise input voltage, input current, output voltage, output current, or any combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, the disclosed embodiment include a thermal monitor and control system having a thermal model for one or more components, thereby enabling thermal monitoring and control without the need for temperature sensors on the various components. In other words, the thermal model is configured to provide (e.g., estimate) the temperature of various components as a function of operating parameters other than component temperature. These operating parameters may include current, voltage, ambient temperature, and so forth. This thermal model and control system with the thermal model may be used in a variety of systems, such as electrical torch systems, compressors, generators, tools, electronics, computers, automotive, aircraft, and so forth. For purposes of illustration, the system is described below in context of plasma cutters.

Figure 1:
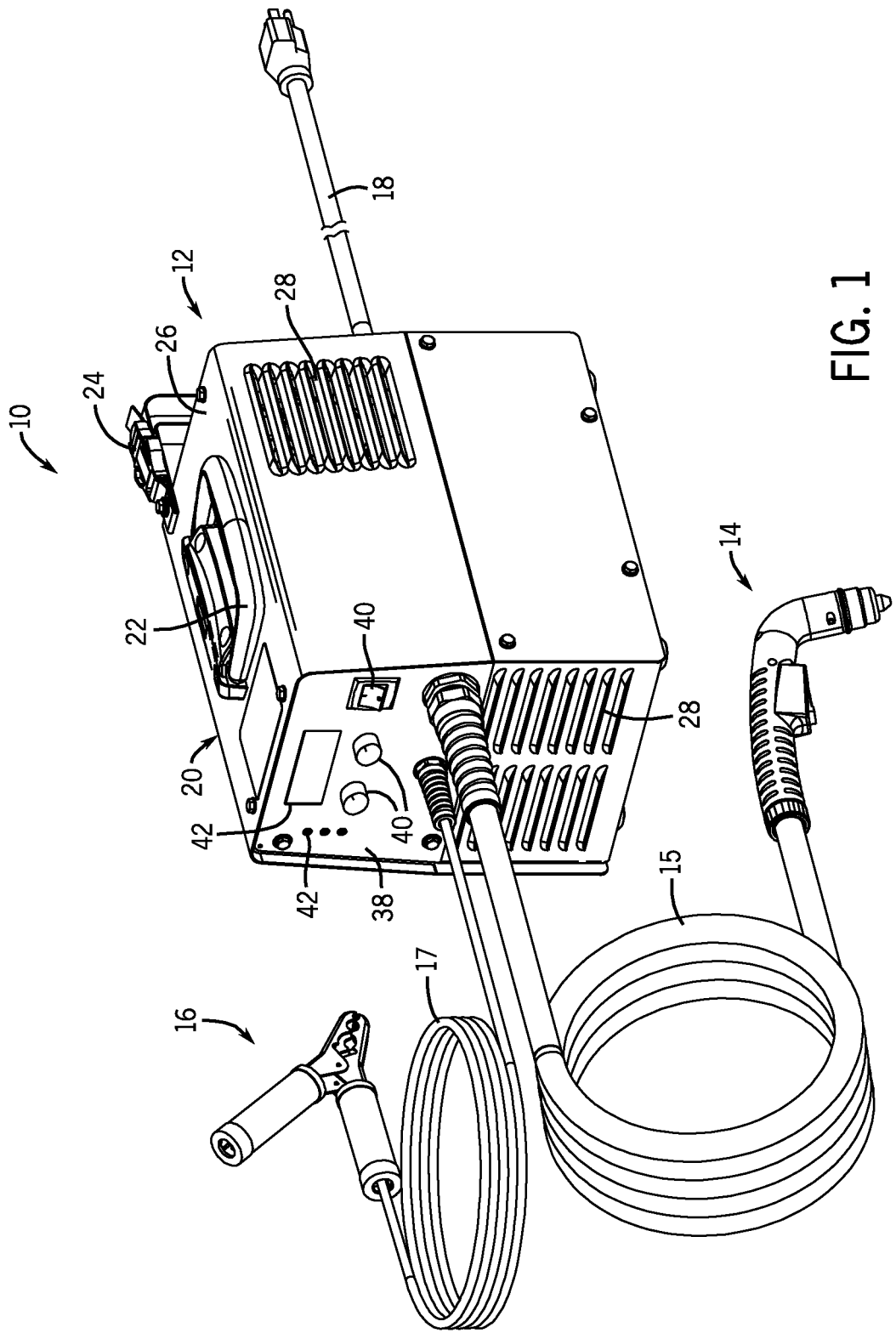
FIG. 1 is a partial perspective view of an exemplary plasma cutting system having a thermal monitor and control system including a thermal model of one or more components in accordance with embodiments of the present invention.
Figure 2:
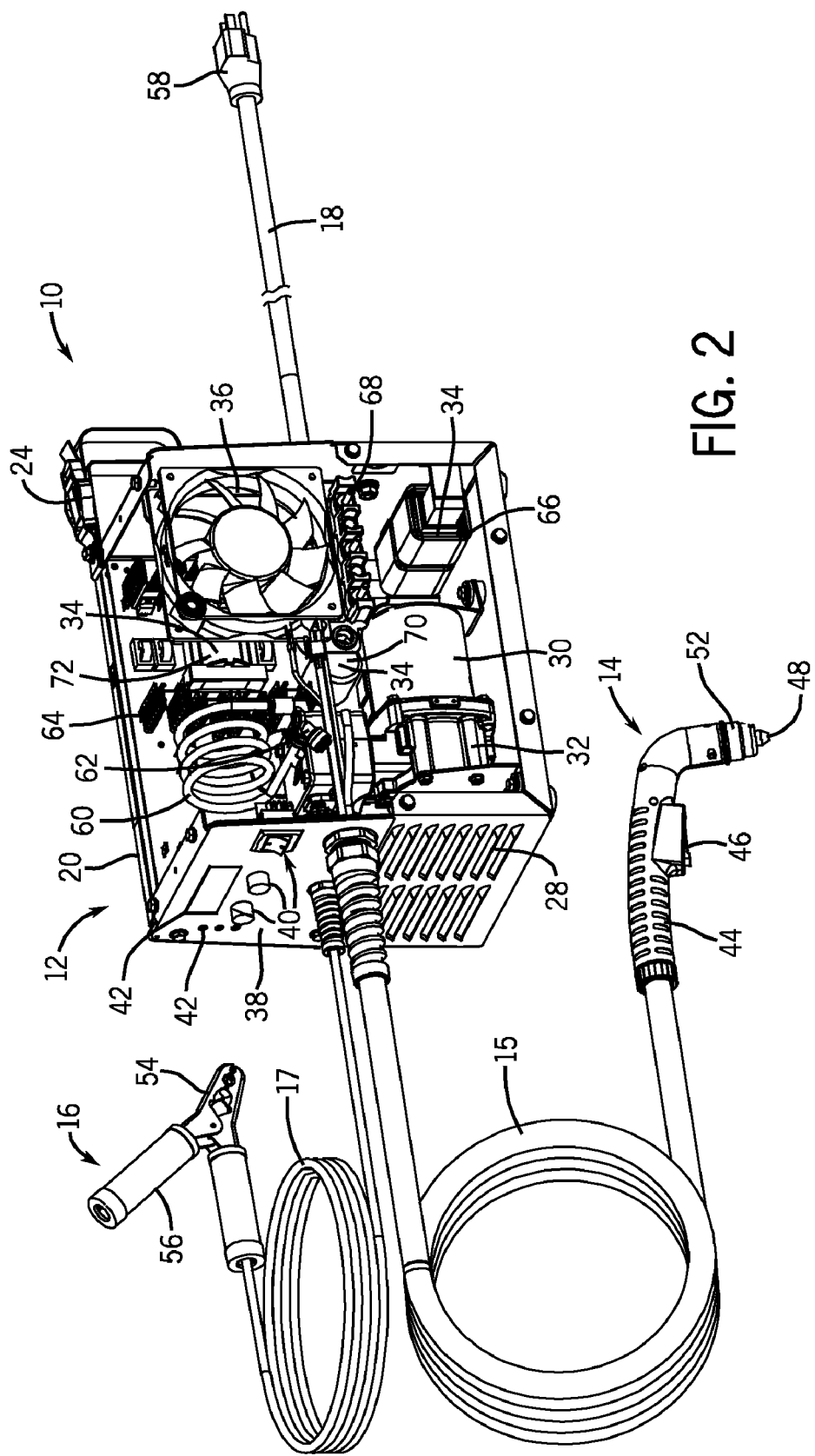
FIG. 2 is another partial perspective view of the plasma cutting system as illustrated in FIG. 1, wherein an entire side panel assembly is removed to further illustrate various internal features in accordance with embodiments of the present invention.

Referring now to the drawings, FIGS. 1 and 2 are partial perspective views illustrating an embodiment of a portable plasma cutting system 10. Specifically, FIG. 1 illustrates the system 10 with access panels completely assembled to close internal components, whereas FIG. 2 illustrates an entire side panel assembly removed to provide a better view of the internal features and components of the system 10.

The illustrated plasma cutting system 10 includes a torch power unit 12 coupled to a plasma torch 14 and a work piece clamp 16 via a torch cable 15 and a work piece cable 17, respectively. The torch power unit 12 may be coupled to a power source (e.g., a power grid or a motor-driven generator) via a power cable 18. The power source may provide a pilot current to a cathode, such as a movable electrode, and to the anode, such as the nozzle of the torch 14, that are forced into contact via a spring. After electrical current begins to flow from the electrode to the nozzle of the torch 14, gas or air supplied to the torch 14 counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created. The plasma jet causes the arc to transfer (at least in part) to the work piece held by the clamp 16, thus initiating cutting. Electronics in the power source sense when the arc has transferred and then supply a main cutting current of greater amperage after the transfer has occurred. Also, the tip of the torch 14 is disconnected (electrically), interrupting the pilot current path. Thus, the current is used to cut the work piece, and follows a path including the positive terminal, the work piece and the electrode. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12. In alternate embodiments, a non-moving electrode torch may be used in which a pilot arc is created via a high voltage and/or high frequency circuit, so that the high voltage may cause the arc to jump from the non-moving electrode to the nozzle. In yet other embodiments, any suitable torch and starting technique may be used.

The power unit 12 includes an enclosure 20 defining a generally closed volume to support various circuits, sensor features, control features, and gas supply features (e.g., air compressor). As discussed in detail below, the illustrated system 10 includes a variety of features to improve portability, serviceability, reliability, and control of the plasma torch 14 and the components within the single enclosure 20 of the system 10. For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power 18. The enclosure 20 may also include vents 28 to relieve heat and/or pressure inside the system 10. Additional vents may be located on other panels of the enclosure 20.

To provide for operation of the plasma torch 14, the system 10 may include a compressor motor 30, such as a DC or AC motor that may include brushed, brushless, switched reluctance, or any other suitable type of motor, and a compressor 32. For example, the compressor 32 may include a positive displacement compressor, such as reciprocating compressor (e.g., piston-cylinder), a rotary screw compressor (e.g., helical screws to compress a gas continuously without a storage tank), a diaphragm compressor, or the like. In certain embodiments, the system 10 may include a flow or pressure meter or like sensor configured to monitor output of the compressor 32. The system 10 also may include environmental sensors, such as a pressure sensor, a temperature sensor, an altimeter, a humidity sensor, or a combination thereof, to provide feedback used to adjust the motor 30, the compressor 32, power electronics 34, or a combination thereof. The power electronics 34 may be configured to condition and provide power to the torch 14 and the compressor 32, and may include transformers, circuit boards, and/or other components. A fan 36 may also be included inside the system 10 to provide air circulation and cooling to the system 10. Additionally, as depicted in FIG. 2, the fan 36 may be located next to one of the vents 28 to optimize air circulation. Additional fans 36 may be included at other locations inside or outside the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, gouge, etc.), power on/off, an output current level, gas (e.g., air) flow rate, gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, voltage, gas flow rate, gas pressure, or other operational parameters, or a combination thereof.

The plasma torch 14 includes a handle 44, a locking trigger 46, a tip 48, a retaining cap 52, as well as an electrode inside the torch 14. The clamp 16 comprises an electrically conductive material clamping portion 54 having insulated handles 56. The power cable 18 includes a plug 58 for connection to a power source such as a wall socket or a motor-driven generator. The plug 58 may be configured to work with a variety of sockets or outlets, and the system 10 may receive different power sources, such as AC 50/60 Hz, 400 Hz, single or three phase 120V, 230V, 400V, 460V, 575V, etc.

Turning now in more detail to FIG. 2, the system 10 includes the fan 36, the gas compressor 32, a heat exchanger 60, pneumatic coupling 62, and heat sinks 64. Additionally, the power electronics 34 includes dual inductor 66, primary terminal block 68, bus capacitor 70, and transformer 72. Additionally, the system 10 may include additional inductors, terminals, capacitors, transformers, or other electrical components and is not limited to the components illustrated in FIGS. 1-2.

As mentioned above, the gas compressor 32 may be a reciprocating compressor (e.g., piston-type compressor), a diaphragm compressor, or a rotary screw compressor. In the illustrated embodiment, the gas compressor 32 is a single stage reciprocating compressor. The compressor 32 may include or may be connected to the DC or AC motor 30 that is connected to power electronics 34 inside the system 10, such that the motor 30 drives the compressor 32. The gas compressor 32 may be rigidly mounted inside the enclosure 20 using compressor mounts such as rubber mounts, plastic mounts, metal mounts, or any other material. The compressor mounts may be configured to dampen vibrations of the compressor or to allow slight movement of the compressor during operation.

In the illustrated embodiment, the gas compressor 32 intakes and compresses air directly from the atmosphere, such as via a filter, and may use one of the vents 28 as an intake vent to enable air to flow into the compressor 32. The gas used by the compressor 32 may be a gas, such as nitrogen, argon, hydrogen, oxygen, or any combination thereof. Accordingly, the gas compressor 32 may provide a direct supply of compressed gas (e.g., air) on-demand to a desired application, such as the plasma torch 14. Thus, the torch 14 may consume air directly from the unit 12 without the air being compressed into a tank downstream of the compressor 32. However, alternative embodiments may include an air tank configured to store the compressed air.

To ensure reliability and performance for the system 10, various temperature sensors (e.g., thermistors) may be included inside the enclosure 20 to measure the temperature of various components. Additionally, a temperature sensor may be provided to measure ambient temperature, e.g. temperature outside of the enclosure 20. As discussed further below, in addition to use of temperature sensors, the illustrated system 10 may include a thermal model and associated logic to estimate the temperature of some components from a plurality of inputs, such as voltages, currents, ambient temperatures, etc. In other words, the thermal model enables estimation of component temperatures without temperature sensors for particular components. In some embodiments, the system 10 may monitor and control all components based entirely or substantially based on one or more thermal models independent from (or without) component temperature measurements.

The system 10 may include control and/or monitoring logic to receive signals from the temperature sensors and/or outputs from the thermal models for various components and perform the appropriate action or indication. For example, if the signal from one or more of the temperature sensors (e.g., thermistors) exceeds a threshold temperature for a component, then the control and monitoring logic may provide a visual warning by activating a LED or LCD 42 on the control panel 38. If the signal from a temperature sensor (e.g., thermistor) exceeds another threshold temperature and/or the signal remains above the threshold for a specific duration, then the control and monitoring logic may also shutdown the system 10 or that component. The control and monitoring logic may prevent use of the system 10 until the signals from the temperature sensors fall below the threshold levels. These monitoring and control functions also may be based, at least in part, substantially, or entirely based on one or more thermal models.

The system 10 may also include control circuitry to coordinate functions of the system components. For example, the system 10 may include control circuitry in the vicinity of the control panel 34. In one embodiment, the control circuitry may include a processor, memory, and software code stored on the memory and executable on the processor to control and or coordinate operation of the system 10. For example, the code may include thermal monitor and control logic configured to monitor one or more components based on temperature feedback and/or non-temperature feedback (e.g., current, voltage, etc.), and control these components and cooling components to obtain desired performance levels without overheating.

The system 10 may include cooling components such as the heat sinks 64 and may include active cooling via the fan 36. The heat sinks 64 may be mounted such that airflow from the fan 36 circulates air around the heat sinks, further enhancing the cooling capability of the heat sinks 64. As discussed above, additional fans may be included in other locations in the system 10. Similarly, additional heat sinks may be placed inside the system 10 depending on those areas that need passive cooling and/or cannot be cooled by any of the fans in the system 10. Thus, in other embodiments, the system 10 may include any number and combination of active and passive cooling components.

During operation of the system 10, a user first connects the system to a power source, such as a wall socket, via the power cable 18 and the plug 58. A user may then turn on the system 10 via the user input 40. The compressor 32, fan 36, and other components of the system 12 receive power from the power electronics 34 and begin operation after the user input is activated and the control circuitry calls for operation. A user then attaches the clamp 16 to a work piece (e.g., metal or other material) to be cut. To begin cutting the work piece, the user places the cutting torch 14 adjacent to the work piece and activates the trigger 46, which may involve raising a locking mechanism to free the trigger 46 before depressing the trigger 46. Compressed gas from the gas compressor 32 passes through the heat exchanger 60 and through the torch cable 15 and out the tip 48 of the torch 14. As discussed above, a pilot current may be supplied between a moveable electrode and the nozzle of the torch 14, thus establishing a pilot arc when the moveable electrode is pushed away from the nozzle of the torch 14 by the gas supplied by the compressor 32. As the electrode moves away from the nozzle of the torch, gas flowing through the torch 14 is energized into a plasma jet which in turn transfers the arc to the work piece.

The electrical arc heats up the gas from the compressor 32, converting it to plasma that is hot enough to cut the work piece. As the user moves the torch 14 across the work piece by dragging, using a drag shield, standoff guide, or the like, the material is cut as the plasma moves through the material. The thickness of the material being cut may be limited by the power of the system 10, the output of the compressor 32, and the torch 14. In addition to supplying the plasma, the compressed gas from the compressor 32 cools the torch 14 and blows away molten material (e.g., molten metal). At the end of the cut, the user releases the trigger 46 of the torch 14. Gas may continue to flow through the torch 14 for a period of time sufficient to cool the consumables, in a state known as "postflow." The postflow cools the torch 14 and ensures that any remaining material is blown away.

Figure 3:
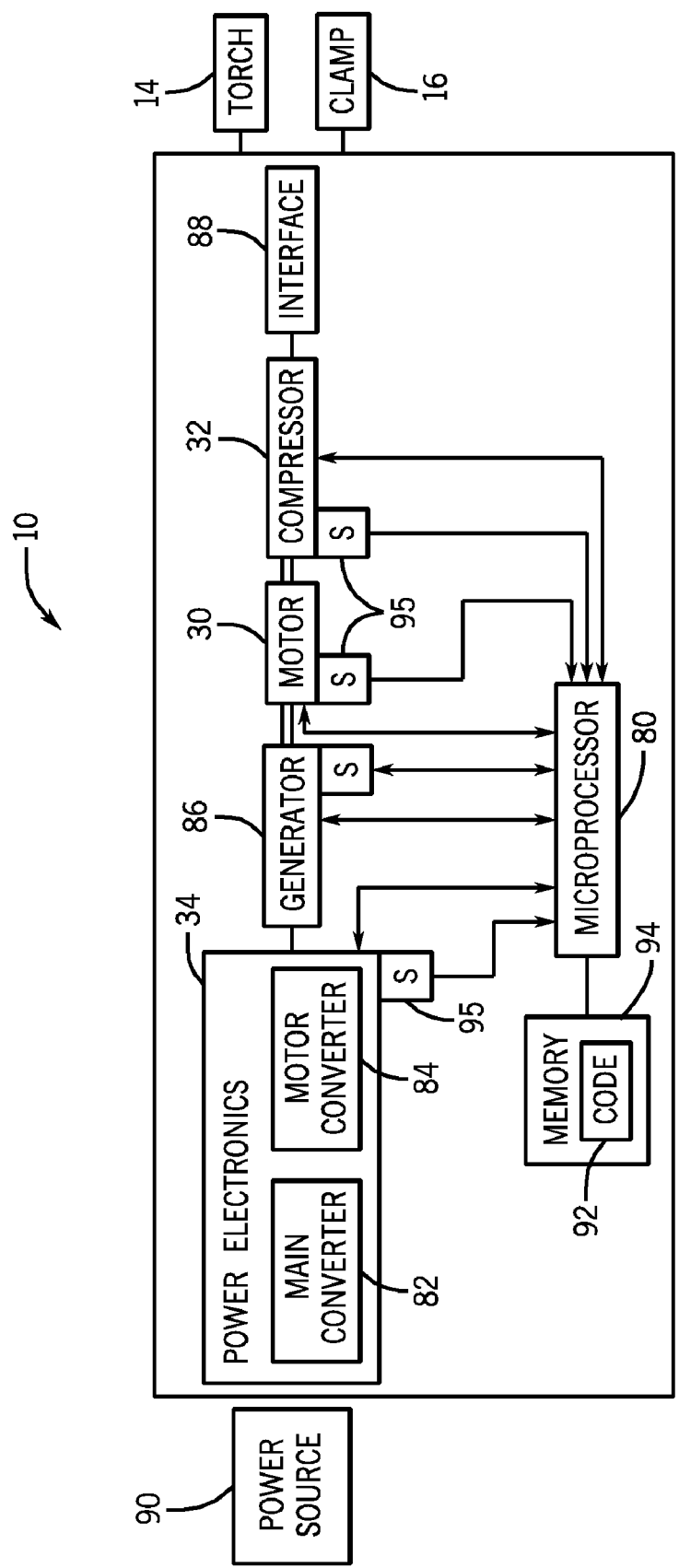
FIG. 3 is a block diagram of the system of FIGS. 1-2 in accordance with an embodiment of the present invention.

FIG. 3 is a block diagram of the system 10 that includes a microprocessor 80 in accordance with an embodiment of the present invention. In some embodiment, the system 10 may include a field programmable gate array (FPGA), digital signal processor, or any suitable integrated circuit (IC) to execute processing of the thermal model or other functions of the system 10. Also depicted in FIG. 2 are the power electronics 34 which may include components for a main power converter 82 and a motor power converter 84. The embodiment illustrated in FIG. 3 also includes a power generator 86, the motor 30, the compressor 32, an interface 88, the torch 14 and the clamp 16. The system 10 is connected to an external power source 90.

The compressor 32 is driven by the motor 30, which may be controlled by code or instructions executed on the microprocessor 80, or in alternate embodiments, may be controlled by a compressor controller. As discussed above, the motor 30 may be an electric motor, such as a DC motor, or a gas combustion engine. For example, the motor 30 may include a two-stroke or four-stroke spark-ignition engine, which includes one or more reciprocating piston in cylinder assemblies, a carburetor or fuel injection system, and so forth. Some embodiments of the system 10 may include the power generator 86 built-in or integrally disposed within the enclosure 20 of the power unit 12. Thus, the motor 30 may drive both the compressor 32 and the electrical generator 86, thereby making the power unit 12 completely portable for use in remote locations. However, other embodiments may exclude the generator 86 to reduce the size, weight, and cost of the power unit 12. Additionally, power electronics 34 provide the power management functions for the system 10. In addition to the main power converter 82 and motor power converter 84, in some embodiments the power electronics 34 include a plasma cutting circuit, a welding circuit, an induction heating circuit, a user input/interface circuit, or a combination thereof.

In addition to controlling the plasma cutting circuit of the system 10, the microprocessor 80 may execute code 92 stored on a memory 94 to monitor and/or control the temperature or other parameters of the system 10. For example, as discussed above, the microprocessor 80 may execute code 92 to process signals from various thermistors, and in response to the measured temperatures of various components/devices in the system 10, shutdown and/or control the device or the system 10 in response to critical temperatures. In accordance with an embodiment of the present invention, the microprocessor 80 may also execute code 92 to determine the temperature of a component/device using the thermal model described further below. In either case, the monitored parameters and/or estimated temperatures may be processed by the microprocessor 80 in view of various thermal monitor and control code, including a thermal model, such that the microprocessor 80 can adjust operating conditions of the various components as well as cooling components (e.g., fan speed, coolant flow rate, etc.) Although some components in the system 10 may not be amenable to direct temperature monitoring via thermistors or other sensors, it may still be desirable to monitor those components for overheating conditions. Thus, a thermal model for a component executed on the microprocessor 80 may determine the temperature of the device from any number of inputs. For example, various devices in the system 10 may include sensors (S) 95. The sensors 95 may send desired data to the microprocessor 80, such as current, voltage, etc. Alternatively, for those devices which are suitable for direct temperature measurement monitoring, the sensors 95 may include thermistors or other temperature sensors.

As will be discussed further below, some of the properties of the device used in the thermal model may be determined experimentally, while others may be determined using other parameters of the device, such as input current and voltage, output current and voltage, etc. Although the discussion may focus specifically on those parameters for the devices being monitored, such as currents and voltages for transistors, the techniques described herein may be used with any parameter or any type of device.

Figure 4:
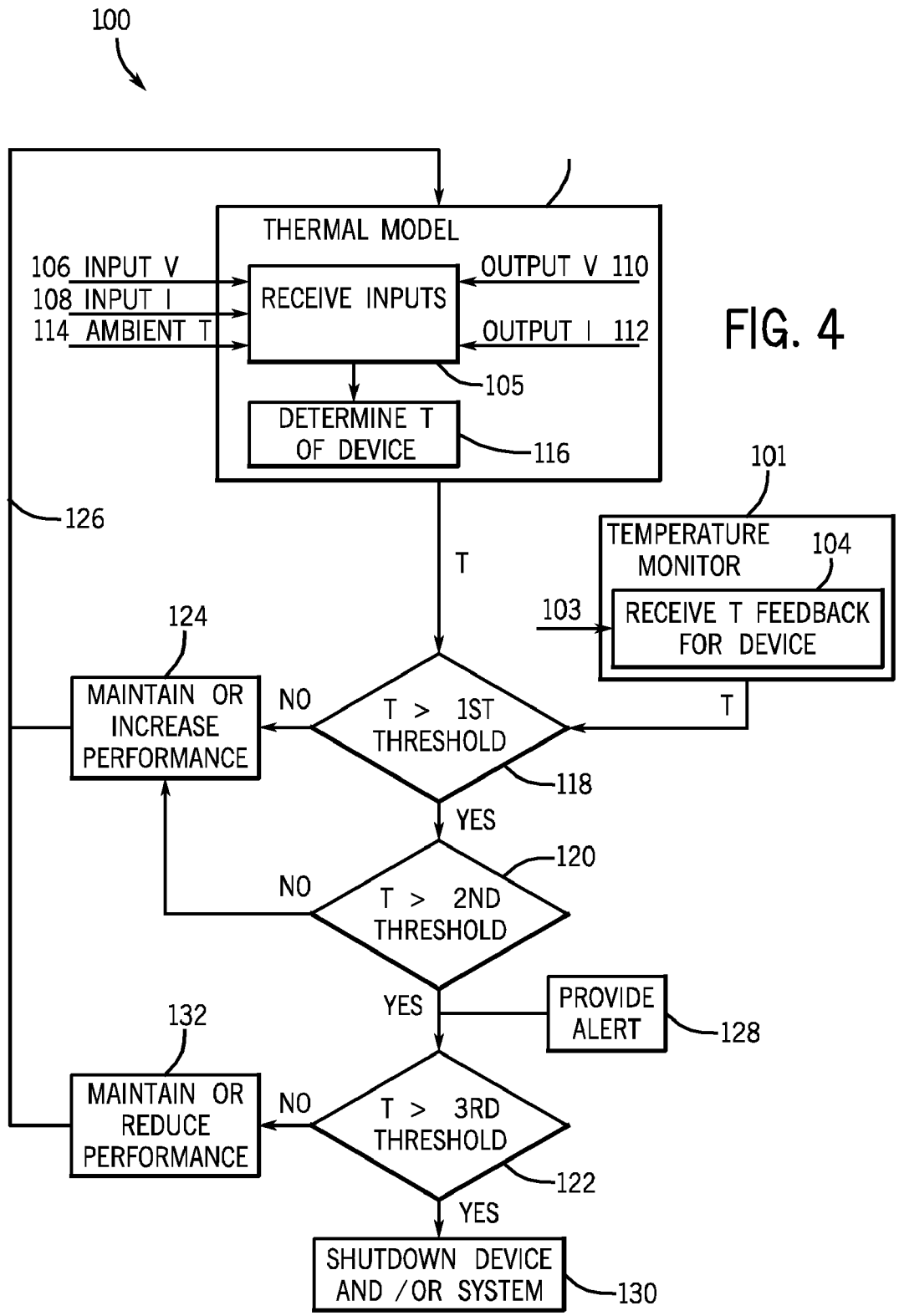
FIG. 4 is a flowchart of a thermal monitor and control system (e.g., logic) having a thermal model in accordance with an embodiment of the present invention.

FIG. 4 depicts a flowchart of a thermal monitor and control process or logic 100 having a temperature monitor 101 and/or a thermal model 102 and control for various components/devices in the system 10. The temperature monitor 101 may be implemented for any device in the system 10, such as by using thermistors 103 to monitor the temperature (block 104). However, for those devices that are less accessible to embedded temperature sensors, the system 10 may advantageously utilize the thermal model 102 described herein to estimate the temperature of these devices. For example, in one embodiment the thermal model 102 may be used to estimate the temperature of brushes of the motor 30 and/or switches of the power electronics 34. In one embodiment, the switches may be field effect transistors, insulated-gate bipolar transistors, any other type of transistor, or any combination thereof.

Beginning with discussion of the thermal model 102, the thermal model 102 may receive any number of inputs (block 105) to be used in determination of the thermal behavior and temperature of a device (without direct measurement of the device temperature). For example, in the embodiment illustrated in FIG. 4, the thermal model 102 may receive an input voltage signal 106 and an input current signal 108, corresponding to the input current and input voltage received by the device. Additionally, if the device is a transistor or other electronic component, the thermal model 102 may receive an output voltage signal 110 and an output current signal 112, corresponding to the output current and output voltage produced by the device, and the model 102 may also receive an ambient temperature signal 114. Any other input may be received by the thermal model 102, such as air flowrate, liquid coolant temperature and/or flowrate, temperature of adjacent components, etc.

The thermal model 102 can determine the temperature of the device from the inputs (block 116), as discussed further below in FIGS. 5 and 6. The thermal model 102 can then output a temperature signal representing the temperature of the device. In some embodiments, the thermal model 102 may provide multiple or different outputs, such as thermal capacity, thermal efficiency, etc. Again, the thermal model 102 is configured to estimate temperature of a particular device not based on a temperature measurement of that device.

To determine the current status of the device, the temperature of the device may be compared to a 1st threshold temperature (block 118), a 2nd threshold temperature (block 120), and a 3rd threshold temperature (block 122). Any number of thresholds temperatures and comparisons may be used. For example, a threshold temperature may be based on a critical operating temperature for the device, and may be set to avoid overheating and damage to the device. For example, if the temperature of the device is greater than the 1st threshold (YES), then the process 100 may continue to the comparison of the temperature with the 2nd threshold (block 120).

If the temperature is not greater than the 1st threshold (NO), the system 10 may maintain or increase performance of the device (block 124). For example, the process 100 may adjust the device and/or system to increase performance, input, output, or other parameters if the temperature remains sufficiently low. The thermal model may continue to monitor and/or determine the current temperature of the device (line 126) for the duration of operation of the system 10. The sample rate of the inputs to the thermal model 102 and the rate of calculation of the temperature of the device may be preset during manufacture of the system, or it may be adjusted dynamically in response to transitive conditions such as start-up, rapid temperature changes, etc.

On a subsequent execution of the process 100, if the temperature of the device is now greater than the 2nd threshold (YES), then the process 100 may provide an alert or other notification (block 128). For example, the alert or notification may activate an indicator 42 on the control panel 38 of the system 10 to indicate that a device is reaching a critical temperature or is near overheating. If the temperature of the device is not greater than the 2nd threshold (NO), then the process 100 may maintain or increase performance of the device (block 124). As the process 100 continues to monitor the temperature of the device, if the temperature is greater than the 2nd threshold, the temperature of the device may be compared to a 3rd threshold (block 122). If the temperature of the device is greater than the 3rd threshold, then the device and/or system may be shutdown (block 130). Thus, in some embodiments, power to the entire system 10 may be turned off in response to the evaluation of the temperature. Alternatively, the process 100 may reduce performance, input, output, or other parameters of the device to reduce the temperature of the device. For example, if the temperature of the device is not greater than the 3rd threshold (NO), then the process 100 may maintain or reduce performance (block 132) of the device, and the thermal model may continue to monitor and determine the current temperature of the device (line 126).

Figure 5:
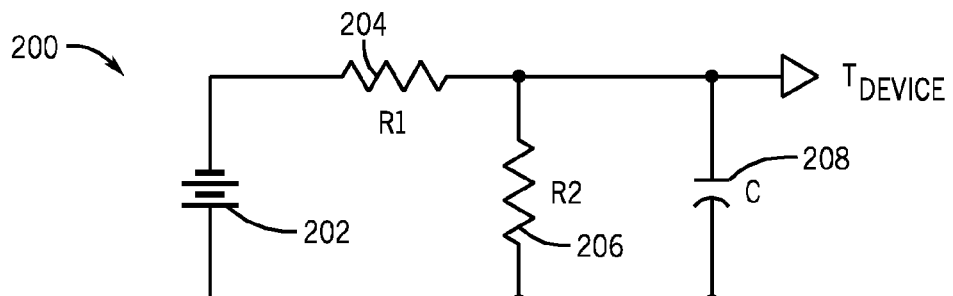
FIG. 5 is a circuit diagram illustrating a thermal model in accordance with an embodiment of the present invention.

Turning now to more detail of the thermal model 102, FIG. 5 is a simplified diagram 200 of a thermal model that includes a power source 202, a first thermal resistance 204 (R1), a second thermal resistance 206 (R2), and a thermal capacity 208 (C). The power source 202 is coupled to the device via thermal resistance 204, and the device is coupled to the environment via thermal resistance 208. The thermal resistance 204 between the power source 202 and the device affects the amount of heat entering the device, and the thermal resistance 208 between the device and environment affects the amount of heat leaving the device. The thermal capacity, i.e. the amount of energy required to increase the temperature of the device, also affects the temperature of the device.

In one embodiment, the thermal model can estimate the temperature of the device by evaluating the condition of the device over a small time interval ($\Delta t$). For example, the thermal model can estimate the amount of heat leaving the device and the amount of heat entering the device over the time interval, and determine the change in temperature of the device for that time interval. The amount of heat leaving the device may be estimated from the following equation:

$$T_{cooling} = e^{-\Delta t/RC}(T_{device} - T_{ambient}) \quad \text{Equation 1}$$

wherein $\Delta t$ is the time interval in seconds, R is the equivalent thermal resistance, and C is the equivalent thermal capacity. The amount of heat entering the device may be estimated by the following equation, in which $\Delta t$ is the time interval in seconds, R is the equivalent thermal resistance, C is the equivalent capacity, P is the equivalent power applied to the device:

$$T_{heating} = R*(1 - e^{-\Delta t/RC})*P \quad \text{Equation 2}$$

Thus, by using the above equations, a thermal model using a thermal capacity and thermal resistance for a device can calculate the amount of heat leaving the device, the amount of heat entering the device, and the temperature of the device at the end of a known time interval.

Figure 6:
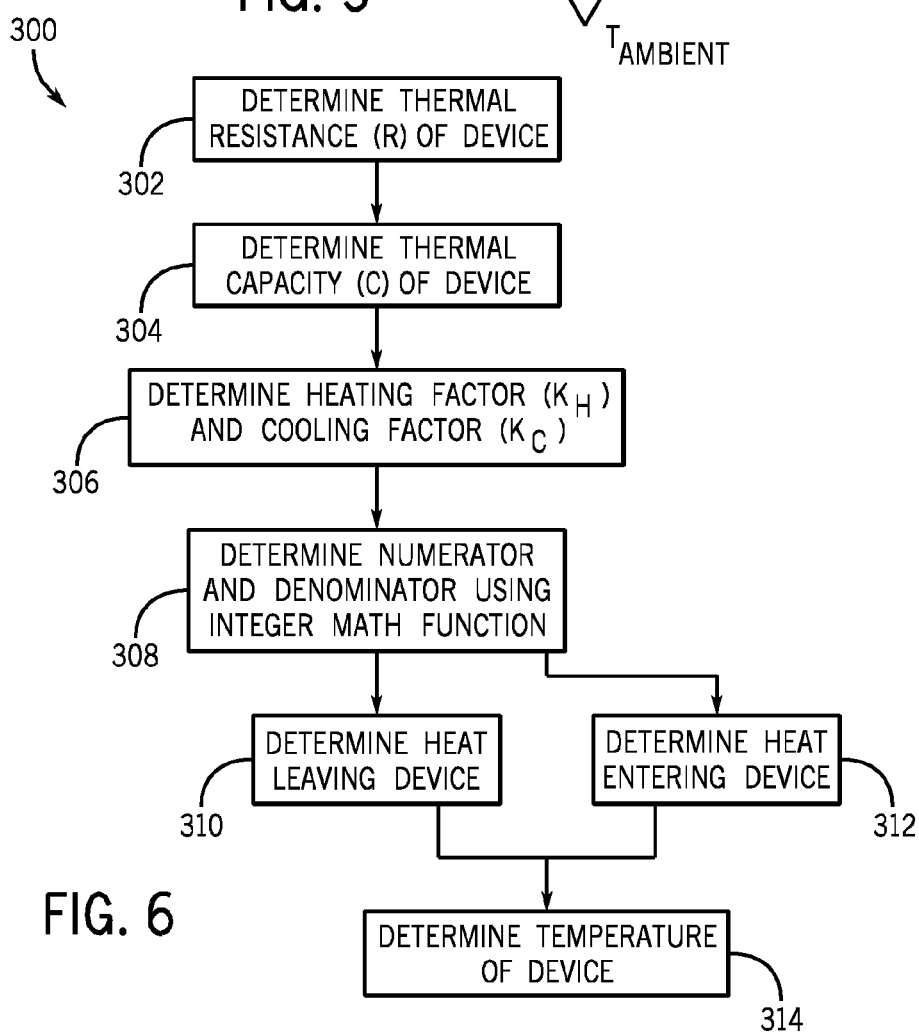
FIG. 6 is a flowchart of a process for generating a thermal model of a device in accordance with an embodiment of the present invention.

FIG. 6 depicts a flowchart of a simplified process 300 for creating a thermal model for a device or component. Initially, the thermal resistance of the device may be determined (block 302). The thermal resistance may be determined experimentally by applying a known input (e.g., power) at a known ambient temperature for a specific time interval such that the device reaches a steady-state temperature. Using this technique, the thermal resistance may be determined by the following equation, in which R is the equivalent thermal resistance, $T_{steadystate}$ is the steady-state temperature of the device, $T_{ambient}$ is the ambient temperature, and P is the known power applied during the time interval:

$$R = (T_{steadystate} - T_{ambient})/P \quad \text{Equation 3}$$

The thermal capacity of the device can also be determined experimentally (block 304). The thermal capacity can be determined by allowing the device to cool from the steady-state temperature to a cooler temperature over a known time interval. The thermal capacity may be determined using the following equation:

$$C = \frac{(-t_{cool}/R)}{\ln((T_{cool} - T_{steadystate})/(T_{steadystate} - T_{ambient}) + 1)} \quad \text{Equation 4}$$

wherein C is the thermal capacity, $t_{cool}$ is the interval of time to reach the cooler temperature, $T_{cool}$ is the cooler temperature, R is the equivalent thermal resistance, $T_{steadystate}$ is the steady-state temperature of the device, and $T_{ambient}$ is the ambient temperature. In other embodiments, the thermal capacity and/or thermal resistance of some devices may be directly measured or may be provided by the manufacturer of the device and are not determined experimentally.

Using the time interval, thermal resistance, and thermal capacity as constants, cooling and heating factors can be determined (block 306). The cooling and heating factors may be used to simplify the software implementation of the thermal model. For example, using the time interval, thermal resistance, and thermal capacity, a cooling factor may be determined using the following equation, in which $K_C$ is the cooling factor, $\Delta t$ is the time interval in seconds, R is the equivalent thermal resistance, and C is the equivalent thermal capacity:

$$K_c = e^{-\Delta t/RC} \quad \text{Equation 5}$$

Additionally, a heating factor may be computing using the following equation, in which $K_H$ is the heating factor, $\Delta t$ is the time interval in seconds, R is the equivalent thermal resistance, and C is the equivalent thermal capacity:

$$K_H = R*(1 - e^{-\Delta t/RC}) \quad \text{Equation 6}$$

Using the heating and cooling factors determined above, the heat leaving the device and heat entering the device may be determined The heat leaving the device may be determined using the following equation, in which $T_{cooling}$ is the heat leaving the device, $T_{device}$ is the temperature of the device and $T_{ambient}$ is the ambient temperature:

$$T_{cooling} = K_C*(T_{device} - T_{ambient}) \quad \text{Equation 7}$$

Additionally, the heat entering the device may be determined using the following equation:

$$T_{heating} = K_H*P \quad \text{Equation 8}$$

As discussed above, because the cooling factor ($K_C$) and the heating factor ($K_H$) are derived from the experimentally determined factors, the temperature of the device can be determined from Equation 7 and Equation 8. Thus, the temperature of the device can then be determined from the following equation:

$$T_{device} = T_{cooling} + T_{heating} + T_{ambient} \quad \text{Equation 9}$$

To simplify implementation in a software thermal model, such as for execution by the microprocessor 80 in the system 10, the above equations for determining $T_{cooling}$, $T_{heating}$, and $T_{device}$ can be implemented using integer math functions. For example, the cooling and heating factors can be divided into a numerator portions and denominator portions, as indicated by the following equations:

$$K_C = \frac{K_{CN}}{K_{CD}} \quad \text{Equation 10}$$

$$K_H = \frac{K_{HN}}{K_{HD}} \quad \text{Equation 11}$$

Using the numerator and denominator portions of the heating and cooling factors, the numerator and/or denominator may be determined using an integer function (block 308), such as by the following set of equations, in which $K_{CN}$ and $K_{HN}$ are the numerator portions of the cooling factor ($K_C$) and heating factor ($K_H$) respectively:

$$K_{CN} = \text{Round}(K_C*K_{CD}) \quad \text{Equation 12}$$

$$K_{HN} = \text{Round}(K_H*K_{HD}) \quad \text{Equation 13}$$

Once the numerators are known, the heat leaving the device (block 310) and heat entering the device (block 312) may be determined from the numerators and denominators of the cooling and heating factors, as shown in the following equations:

$$T_{Cooling} = (K_{CN} * (T_{device} - T_{ambient}))/K_{CD}$$ Equation 14

$$T_{heating}(K_{HN} * P)/K_{HD}$$ Equation 15

Once the heat leaving the device and the heat entering the device are known, the temperature of the device can then be determined from the following equation:

$$T_{device} = T_{cooling} + T_{heating} + T_{ambient}$$ Equation 16

As can be seen from the above equations, the numerator of the cooling factor ($K_{CN}$) and the numerator of the heating factor are determined using a Round function. In one embodiment, a power of two value may be chosen for the denominators $K_{CD}$ and $K_{HD}$, and the divides may be implemented using binary left shifts, thus increasing the speed and efficiency of execution on a microprocessor.

As discussed above, one factor used in the thermal model, such as in determination of the thermal capacity (C) is the power applied to the device (P). Depending on the device being implemented via the thermal model, the power may be directly measured. For other devices or components, such as those with a known load, the power may be a fixed number that has been empirically measured.

For other devices, such as power switching devices like insulated gate bi-polar transistors, field effect transistors, power is not easily measured, as it is the time-integrated product of instantaneous voltage and current for the device. For such devices or components, the temperature rise above ambient may be determined from the conditions or parameters that affect the increase in temperature. For example, the efficiency of a switching device such as a transistor may be a function of output voltage, output current, system input voltage, system input current, and ambient temperature. These characteristics and parameters may be measured directly using parametric techniques. In one embodiment, the temperature of a field effect transistor may be determined primarily to be a function of output current. Thus, the constants for the heating and cooling factors described above, and the temperature determination, may be based on the change in output current. For any changes to these inputs, such as a change in output current, the constants may be updated, thus updating the temperature determination from the thermal model.

Advantageously, the indirect measurement of the temperature of such components eliminates or substantially reduces thermistors, may reduce complexity and cost, and may increase reliability. Additionally, indirectly measuring the temperature of high voltage components, such as switching devices, minimizes any electrical hazards that may be associated with direct temperature measurement.

It should be appreciated that the thermal model described herein is applicable to any type of system. For example, an induction heating system, a welding system, a plasma cutting system, or any system that includes an engine, generator, motor, and/or compressor, or any combination thereof may also implement a feedback loop and automatic adjustment mechanism using the sensor and logic described herein. Additionally, the thermal model may be retrofitted via a software update to any system having the necessary processing capability and inputs to process the thermal model.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a torch power unit, comprising:
a monitor and/or control configured to determine a temperature of a component of the torch power unit based on one or more inputs without a direct temperature measurement of the component, wherein the one or more inputs comprise input voltage, input current, output current, output voltage, air flowrate, ambient temperature, or any combination thereof.

2. The system of claim 1, wherein the torch power unit comprises a motor coupled to a compressor, a generator, or a combination thereof.

3. The system of claim 1, wherein the component comprises one or more brushes of the motor.

4. The system of claim 1, wherein the component comprises an electrical component.

5. The system of claim 1, wherein the component comprises a magnetic component.

6. The system of claim 4, wherein the component comprises a field effect transistor, an insulated gate bi-polar transistor, or any combination thereof.

7. The system of claim 1, wherein the monitor and/or control is configured to shutdown the component if the temperature exceeds a threshold.

8. The system of claim 1, wherein the monitor and/or control is configured to modify an input, output, performance of the component, or any combination thereof, if the temperature exceeds a threshold.

9. The system of claim 1, wherein the torch power unit comprises a plasma cutting system, a welding system, an induction heating system or a combination thereof.

10. The system of claim 1, wherein the monitor and/or control comprises a microprocessor, code disposed on a tangible machine-readable medium, or a combination thereof.

11. The system of claim 1, wherein the monitor or control comprises a field programmable gate array, a digital signal processor, code disposed on a tangible machine-readable medium, or a combination thereof.

12. The system of claim 1, wherein the monitor and/or control comprises a thermal model.

13. The system of claim 1, wherein the monitor and/or control further comprises a temperature monitor configured to directly measure temperature of one or more components.

14. The system of claim 1, wherein the monitor and/or control is configured to control the component, the torch power unit, another component, or a cooling device, or a combination thereof, based on the temperature.

15. The system of claim 1, wherein the monitor and/or control is configured determine at least one of a thermal resistance or a thermal capacity of the component.

16. The system of claim 15, wherein the monitor and/or control is configured to determine heating and cooling factors of the torch power unit based at least in part on at least one of the thermal resistance or the thermal capacity of the component.

17. The system of claim 16, wherein the monitor and/or control is configured to determine a thermal model based at least in part on the heating and cooling factors, and wherein the monitor and/or control is configured to determine the temperature of the component based at least in part on the thermal model.

18. A method of operation, comprising:
receiving one or more inputs associated with a device; and
estimating a temperature of the device based on the one or inputs without directly measuring the temperature of the device, wherein receiving the one or more inputs comprises receiving input voltage, input current, output voltage, output current, or any combination thereof.

19. The method of claim 18, wherein receiving the one or more inputs comprises receiving ambient temperature, air flowrate, or a combination thereof.

20. The method of claim 18, wherein estimating the temperature of the device comprising estimating the amount of heat leaving the device and the amount of heat entering the device over an interval of time.

21. The method of claim 18, comprising controlling a cooling level, device operating level, or a combination thereof.

22. The method of claim 18, comprising adjusting an input, output, or performance of the device based on the temperature.

23. A system, comprising:
a torch power unit,
   one or more components comprising a generator, a power converter, a compressor, a motor, or a combination thereof; and
   a monitor and/or control configured to determine the temperature of the one or more components based on one or more properties of the components, wherein the properties comprise input voltage, input current, output voltage, output current, or any combination thereof.

* * * * *